United States Patent [19]

Nagaoka et al.

[11] Patent Number: 4,649,648
[45] Date of Patent: Mar. 17, 1987

[54] LINEAR SCALE

[75] Inventors: Kazuo Nagaoka, Kanagawa; Tomoichi Isobe, Chiba; Toshihiko Kanasugi, Kanagawa; Nobuyuki Suzuki, Kanagawa; Sadao Wakabayashi, Kanagawa; Kenji Uchida, Kanagawa; Hideharu Tsukamoto; Mitsuru Ohno, both of Tokyo; Tadahiko Shimano, Chiba, all of Japan

[73] Assignee: Sony Magnescale Incorporation, Tokyo, Japan

[21] Appl. No.: 770,216

[22] Filed: Aug. 28, 1985

[30] Foreign Application Priority Data

Aug. 31, 1984 [JP] Japan ............................. 59-132137
Sep. 4, 1984 [JP] Japan ............................. 59-183856
Sep. 4, 1984 [JP] Japan ............................. 59-183857

[51] Int. Cl.$^4$ ............................................. G01B 11/04
[52] U.S. Cl. ................................... 33/125 R; 33/125 T
[58] Field of Search ............. 33/125 R, 125 A, 125 C, 33/125 T

[56] References Cited

U.S. PATENT DOCUMENTS

| | | | |
|---|---|---|---|
| 3,975,100 | 8/1976 | Taylor | 33/125 A |
| 4,198,757 | 4/1980 | Nelle et al. | 33/125 C |
| 4,320,578 | 3/1982 | Ernst | 33/125 T |
| 4,530,157 | 7/1985 | Nelle | 33/125 R |
| 4,549,354 | 10/1985 | Affa et al. | 33/125 C |

*Primary Examiner*—Willis Little
*Attorney, Agent, or Firm*—Vorys, Sater, Seymour & Pease

[57] ABSTRACT

A linear scale features a removable scale channel and adjustable head assembly for easy, accurate, permanent positioning on a machine tool bed or other mobile device. The scale channel, and a matching positioning tool, has balls at opposite ends engaging a socketed mounting bracket. When in use, the flexible socket coupling is clamped into immobility by removable covers over open faces of the mounting brackets. During installation, the mounting brackets engage the positioning tool rather than the scale channel and with the flexible-socket couplings free to gimbal. The mounting brackets are fixed to the machine tool at a fixed axial spacing determined by the length of the positioning tool but at whatever angular attitude best suits the supporting surface of the machine tool. The positioning tool is then removed and replaced by the scale channel. The head assembly is fixed to a stationary stand opposite the scale channel. An adjustable mechanism allows the sliding head of the head assembly to move perpendicular to the axial direction relative to a base fixed to the stand.

32 Claims, 32 Drawing Figures

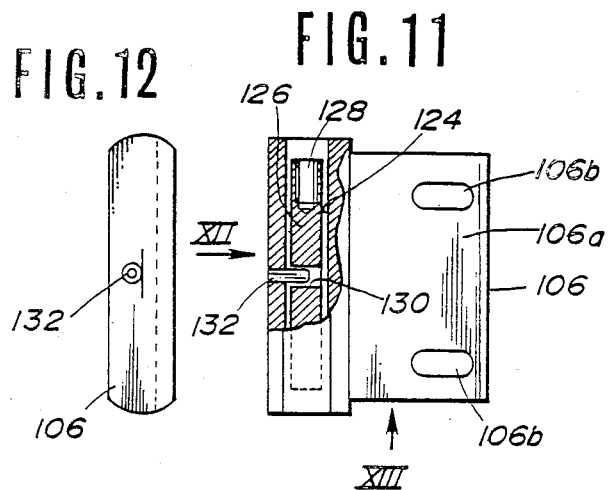
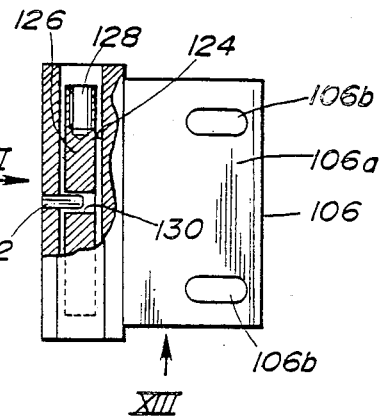
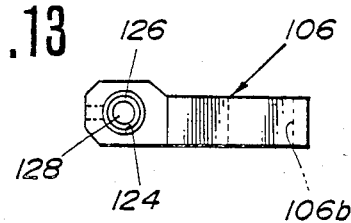
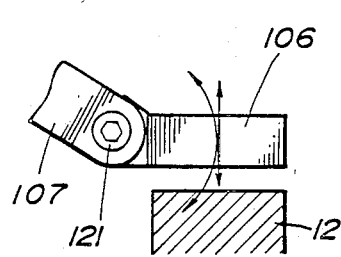
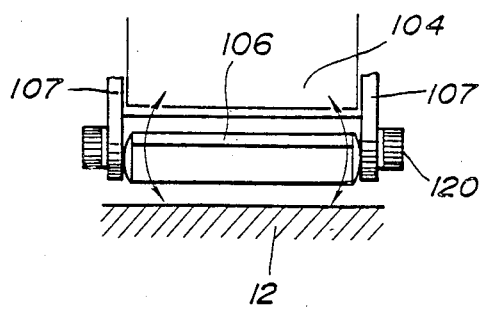

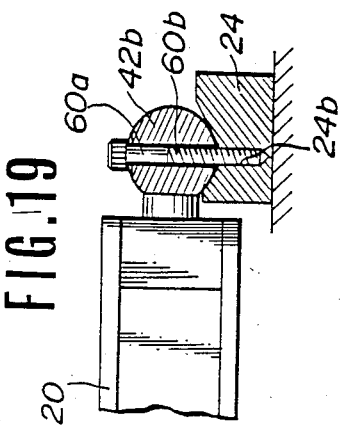
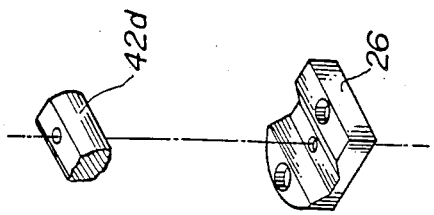
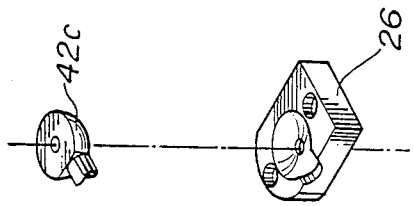
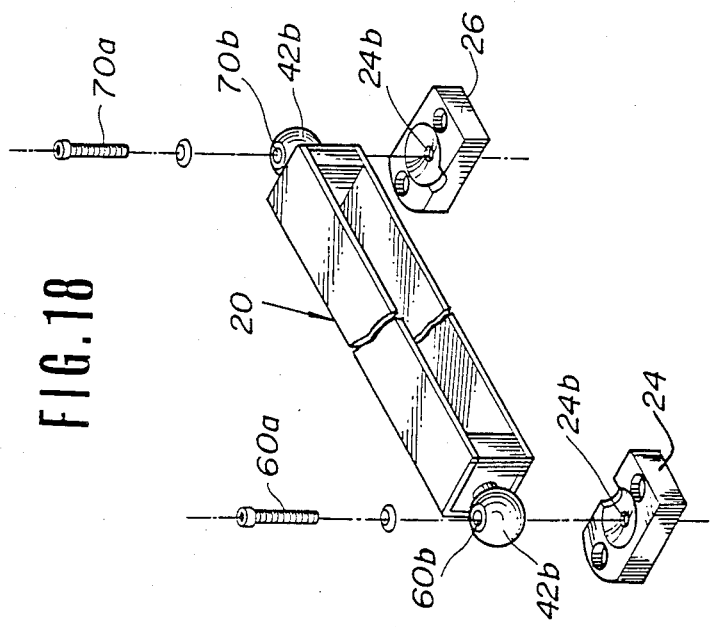

LINEAR SCALE

BACKGROUND OF THE INVENTION

1. Field of the Invention

The present invention relates generally to a linear scale incorporating a magnetic scale, an optical scale or the like. More particularly, the invention relates to a linear scale unit which can be easily assembled and easily mounted on a machine tool or other devise to be monitored.

2. Description of the Prior Art

Magnetic scales and optical scales, among others, have been used for numerical machine tool control. Conventional scale elements have been fixedly mounted on the machine tool by means of a base. This causes problems during maintenance and replacement of the linear scale. For instance, the alignment of conventional linear scales must be adjusted each time the scale is detached from the machine tool. Alignment adjustment is conventionally performed by means of a pick-tester, adjusting shims and so forth and is relatively time-consuming for truly accurate adjustment of the alignment. Furthermore, conventional scales require delicate adjustment when installing the scale unit on the machine tool using spacers to compensate for inevitable distortions or slight bends in the scale channel incurred during manufacture.

Furthermore, with conventional scales, additional problems are encountered in fitting a head assembly of the scale unit onto a fitting bracket of the machine tool. The conventional technique for fitting the head assembly onto the fitting bracket is to adjust the vertical height of a head carrier relative to the fitting bracket by means of a spacer. The range of adjustment of the head assembly with respect to the fitting bracket by means of the spacer is very limited. This requires adjustment of the height of the fitting bracket at the user's end.

SUMMARY OF THE INVENTION

Therefore, it is an object of the present invention to provide a linear scale which is easy to assemble and to install on a machine tool or the like.

Another and more specific object of the invention is to provide a linear scale having a scale channel which allows delicate adjustment during installation on the device by compensating for dimensional deviations due to distortion and/or bending incurred during manufacture.

A further object of the present invention is to provide a linear scale with a head assembly which is fixed to one of a stationary stand opposite the device and a movable component in the device and movable relative to a scale according to relative displacement of the stationary stand and the movable component, which head assembly is allowed positional adjustment relative to the scale and/or the one of the stationary stand and the movable component to which it is fixed.

In order to accomplish the aforementioned and other objects, a linear scale incorporates means providing spatial adjustability with respect to the device on which the linear scale is mounted. The adjusting means includes an element spatially adjustable relative to the mating section of the device.

The adjustable element incorporated as part of a scale head assembly is movable vertically relative to a mating section of the device, such as a mounting bracket extending from the device. Alternatively, the adjusting element may comprise end members provided at either end of a scale channel on which the scale head assembly is mounted. The end members flexibly engage mounting members for allowing delicate and accurate position adjustment and are firmly fixed to the mounting members after the fine position adjustment is completed.

In the preferred embodiment, the scale channel with the head assembly can be positioned by determining the positions of the mounting members relative to the device by means of a positioning tool. The positioning tool is essentially the same length as the scale channel. Engagement between the end member and the corresponding mounting member is releasable to allow removal of the scale channel without removing the mounting member from the device.

Such adjusting means facilitates positioning adjustment of the linear scale with respect to the device. In particular, the vertically movable adjustable member on the scale head assembly facilitates adjustment of the distance between the part of the scale head assembly engaging the mounting bracket and the mounting bracket without the need for spacers. In addition, the releasable engagement between the ball-like end members and the mounting members preserves the positioning accuracy of the mounting members on the device achieved by means of the positioning tool when the scale head assembly must be removed.

According to one aspect of the invention, a linear scale comprises a scale rod, a head assembly associated with the scale rod and movable therealong for measuring displacement of a moving object relative to a stationary member in a direction parallel to the scale rod, a scale channel supporting the scale rod, and means for positioning the head assembly and the scale channel relative to the moving object and the stationary member, the positioning means being independent of at least one of the head assembly and the scale channel to allow displacement of the one of the head assembly and the scale channel for fine position adjustment relative to the object and/or the stationary member, and that the positioning means incorporates fastening means restricting movement of the one of the head assembly and the scale channel relative to the positioning means in order to hold the one of head assembly and the scale channel in place relative to the object and/or the stationary member.

The positioning means comprises a pair of mounting blocks fixed to one of the stationary member and the moving object and releasably supporting the scale channel, the mounting blocks allowing gimbal displacement of the scale channel relative thereto for positioning adjustment of the scale channel relative to the movable object. The scale channel has rounded extensions at both of its longitudinal ends, the rounded extensions releasably engaging a corresponding one of the mounting blocks pivotally to allow displacement of the scale channel.

According to another aspect of the invention, a method for mounting a linear scale comprises the steps of:

providing a linear scale including a head assembly and scale channel which is in a predetermined length and a predetermined shape;

providing a pair of mounting brackets engageable to both longitudinal ends of the scale channel;

providing a positioning tool of substantially the same length to the scale channel and having a positioning plane adapted to mate with a corresponding plane of a stationary member to which the linear scale is positioned and secured;

engaging the mounting brackets onto both longitudinal ends of the positioning tool and positioning the mounting bracket relative to the stationary member by means of the positioning tool;

fixing the mounting blocks onto the stationary member at the positions determined by the preceding step; and releasing the positioning tool from the mounting blocks as fixed to the stationary member and mounting the scale channel with engagement of its longitudinal ends to the mounting blocks.

According to a further aspect of the invention, a method for mounting a linear scale used to measure the relative displacement of two objects, comprises the steps of:

mounting one of a pair of mounting brackets on a first one of the objects;

coupling opposite ends of a positioning tool, identical in size and shape to a scale channel forming part of the finished linear scale, to each of the mounting brackets so as to hold the mounting brackets at a fixed linear separation;

positioning the remaining mounting bracket on the first object at the fixed linear separation and fixing the remaining mounting bracket to the first object;

removing the positioning tool from the mounting brackets;

coupling opposite ends of the scale channel to the mounting brackets;

engaging the mounting brackets onto both longitudinal ends of the positioning tool and positioning the mounting brackets relative to the stationary member by means of the positioning tool;

fixing the mounting blocks onto the stationary member at the positions determined by the preceding step; and releasing the positioning tool from the mounting blocks as fixed to the stationary member and mounting the scale channel with engagement of its longitudinal ends to the mounting blocks.

Other objects and advantages accomplished by the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings:

FIG. 11 is a plan view of the major part of the scale head assembly of FIG. 10;

FIG. 12 is a view of the major part of FIG. 11 along arrow XII of FIG. 11;

FIG. 13 is a view of the major part of FIG. 11 as viewed along arrow XIII of FIG. 11;

FIG. 14 is a diagram showing how the position of the head relative to the stationary stand can be adjusted;

FIG. 15 is a view along arrow XV of FIG. 14.

FIG. 18 is an exploded perspective view of the third modification of the scale channel mounting structure;

FIG. 19 is a section taken along line XIX—XIX of FIG. 18;

FIG. 20 is an exploded perspective view of an alternative of the third modification of FIG. 18;

FIG. 21 is an exploded perspective view of another alternative of the third modification of FIG. 18;

DESCRIPTION OF THE PREFERRED EMBODIMENT

Figure 1:
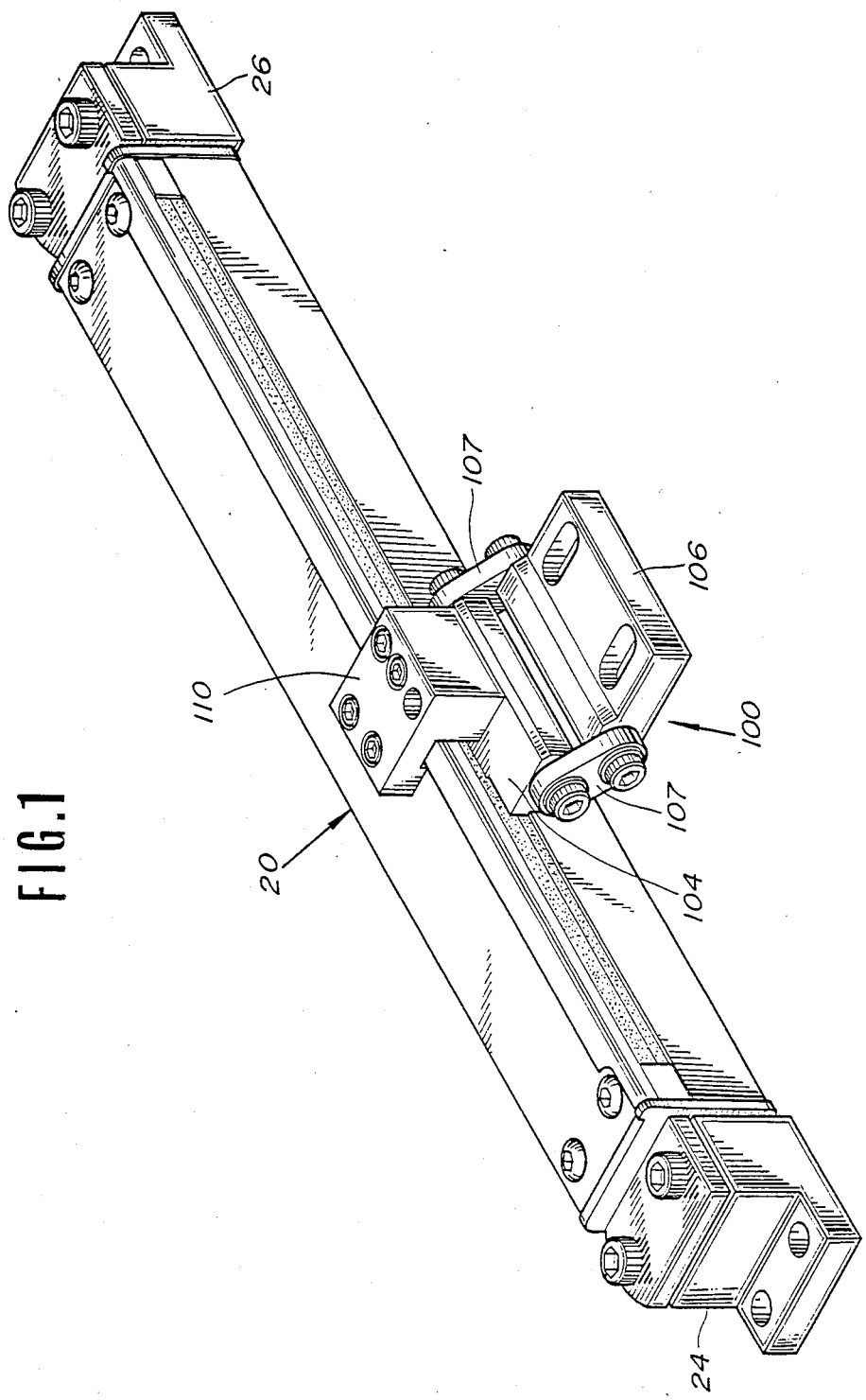
FIG. 1 is a perspective view of the preferred embodiment of a linear scale in accordance with the present invention.
Figure 2:
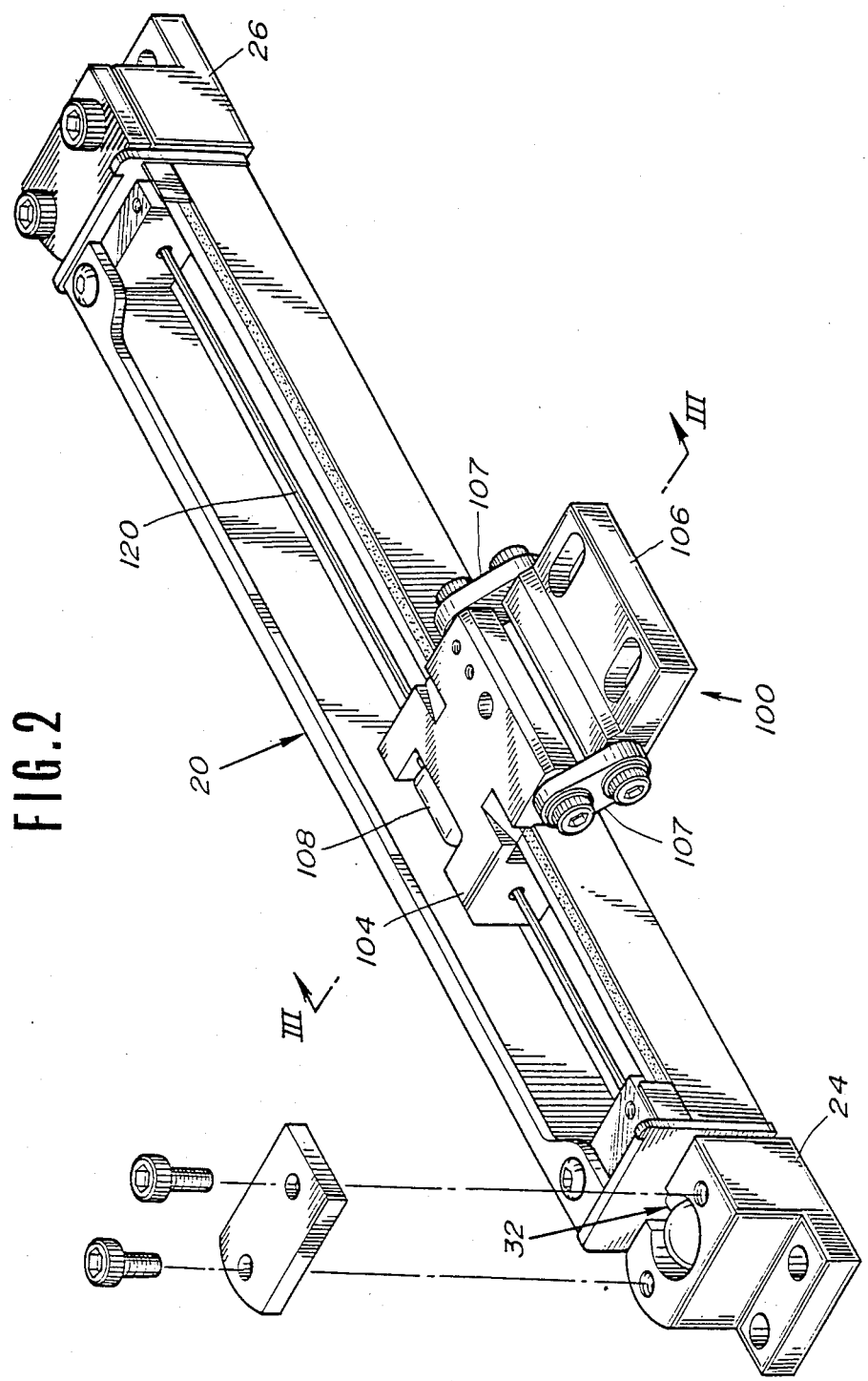
FIG. 2 is a view similar to FIG. 1 with the scale channel cover plate removed to show the engagement between the slider head and the scale rod.
Figure 3:
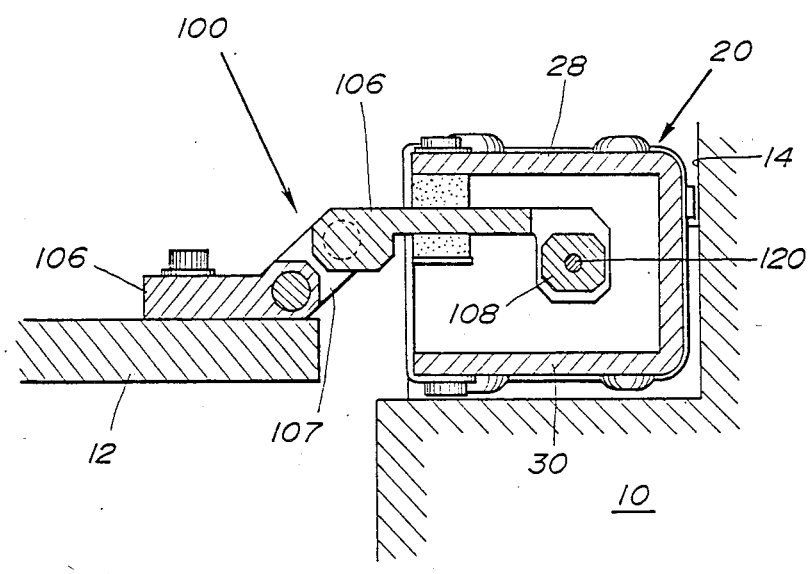
FIG. 3 is a cross-section taken along line III—III in FIG. 2.
Figure 4:
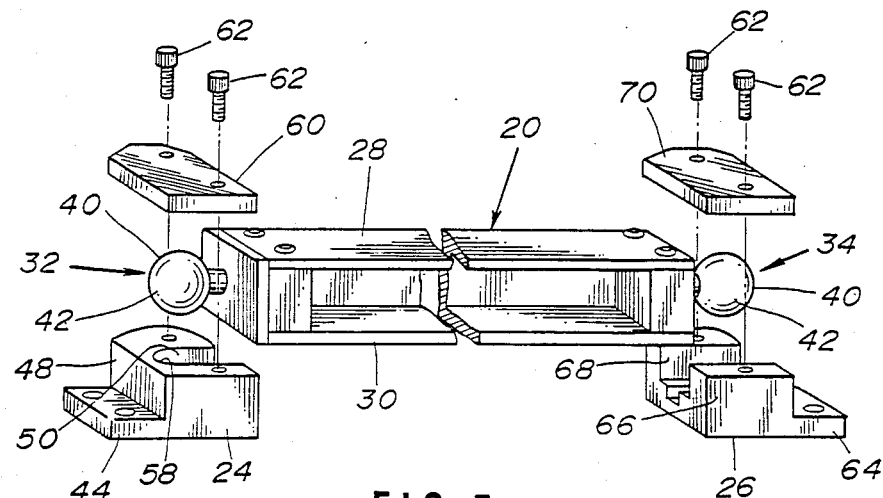
FIG. 4 is a perspective view of the scale channel and associated parts of the preferred embodiment of the linear scale of FIG. 1.
Figure 5:
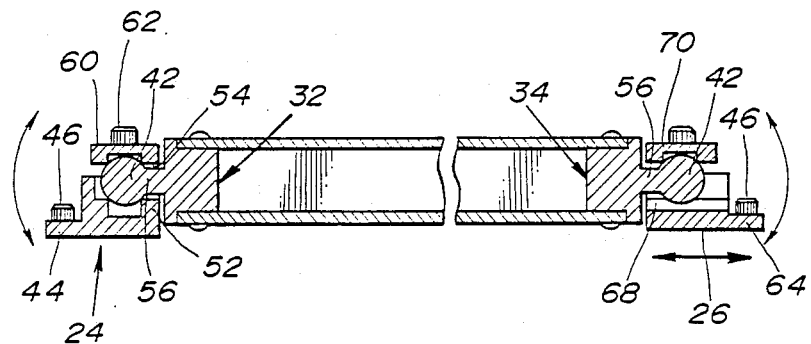
FIG. 5 is a longitudinal section through the scale channel taken along line V—V of FIG. 4.
Figure 6:
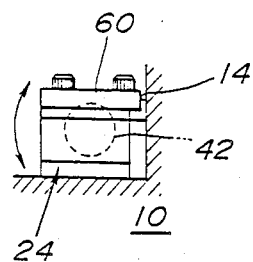
FIG. 6 is a side elevation of the scale channel as viewed along the arrow VI of FIG. 5.

Referring now to the drawings, particularly to FIGS. 1 to 3, a linear scale of the preferred embodiment of the invention generally comprises a scale channel 20 and a scale head assembly 100 associated with a magnetic scale rod 120 of the scale channel. The scale channel 20 has a pair of mounting blocks 24 and 26 which are designed to be fixed to a linear unit 10, such as the movable bed of a machine tool or the like. The mounting blocks 24 and 26 serve to fixedly secure the scale channel in place on the unit 10 after the former is accurately positioned on the latter by means of a positioning tool which will be discussed later.

The scale channel 20 is detachably mounted in place on the unit 10 by means of the mounting blocks 24 and 26 and supports the scale head assembly 100. In order to fit onto the scale channel 20, the head assembly 100 has a sliding frame 104. The head assembly 100 incorporates a slider 106 connected to the sliding frame 104 by means of a pair of joint arms 107. The slider 106 is movable vertically relative to the sliding frame 104 in order to allow adjustment relative to a stationary stand 12 on a stationary stand (not shown) near the unit 10.

The magnetic scale rod 120 extends through the sliding frame 104 opposite a detector head 108. Techniques for monitoring position and displacement of the unit 10 are well known and thus need no further discussion.

FIGS. 4 to 9 show detailed structure and mounting procedures of the scale channel 20 forming part of the preferred embodiment of the linear scale according to the present invention. As shown in FIGS. 2 and 3, the scale channel 20 comprises a channel shaped member having upper and lower flats 28 and 30 spaced apart and parallel to each other. A pair of end blocks 32 and 34 are provided at opposite ends of the scale channel between the upper and lower flats 28 and 30. Each of the end blocks 32 and 34 has a section 36 of essentially square cross-section sandwiched between the corresponding ends of the upper and lower flats 28 and 30. The upper and lower flats 28 and 30 are secured to the end blocks 32 and 34 by means of bolts 36. A projecting section 40 with a ball-like end 42 extends axially from the outer surface of the section 36 of each of the end blocks 32 and 34. The ball-like end 42 of the end blocks 32 and 34 is designed to engage the mounting blocks 24 and 26 which are designed to be fixedly secured to the unit 10, as set forth above.

The mounting block 24 has a base section 44 to be secured to the surface of the unit 10 by means of bolts 46. An upper section 48 atop the base section 44 has a stepped groove which is generally referred to by the reference numeral 50. The groove 50 includes an upper stepped section 52 near the end block 32 defining an opening 54 receiving the cylindrical stem 56 of the ball-like end 42 of the projecting section 40. The major section of the groove 50 receives the ball-like end 42 of the end block 32, and has a rounded end 58. A cover plate 60 is releasably attached to the upper end of the upper section 48 of the mounting block 24 to seal the stepped groove 50 of the upper section 48, by means of bolts 62. The opening 54 of the section 52 is slightly larger than the stem section 56 of the projecting section 40 to allow the mounting block 24 to gimbal relative to the scale channel 20. On the other hand, axial movement of the scale channel 20 relative to the mounting block 24 is restricted by restricting the axial movement of the ball-like end 42 by means of the upper section 48.

The mounting block 26 also has a base section 64 and an upper section 66. The upper section 66 also has an axial stepped groove 68. The groove 68 receives the ball-like end 42 of the projecting section. A cover plate 70 is closes the upper open end of the groove 68. With this arrangement, the scale channel 20 and the mounting block 26 can gimbal relative to each other freely. Since the mounting block 26 does not restrict axial displacement of the scale channel, dimensional errors of the scale channel in the length can be compensated for in the engagement between the ball-like end 42 of the projecting section 40 and the mounting block 26.

Figure 7:
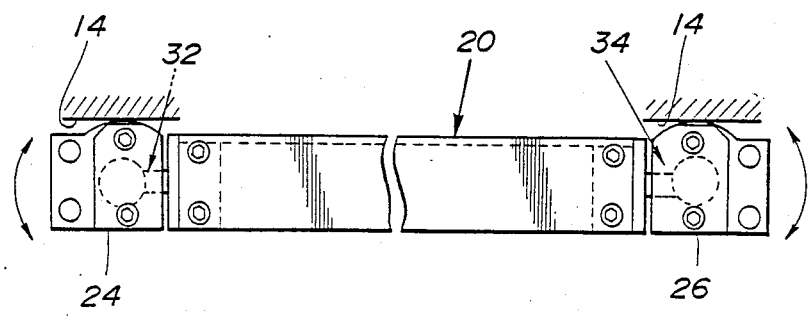
FIG. 7 is a plan view of the scale channel of FIG. 4.
Figure 9:
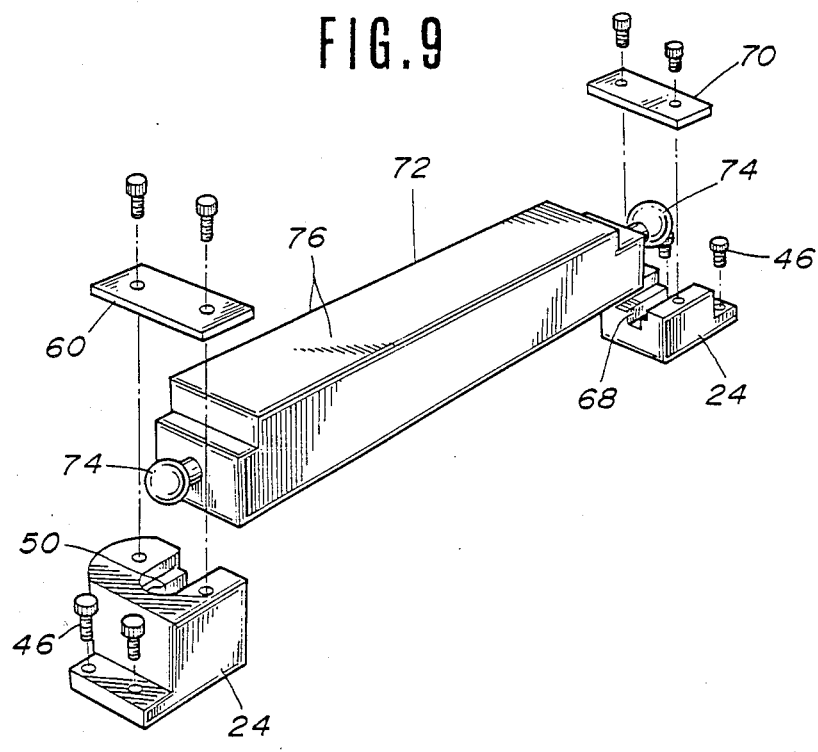
FIG. 9 is a perspective view showing how the scale channel is positioned relative to the device by means of a positioning tool.

As best shown in FIG. 7, the mounting blocks 24 and 26 each have one convex side wall in tangential contact with a vertical mating wall 14 of the unit 10. This allows horizontal pivotal displacement of the mounting blocks 24 and 26 about the ends of the scale channel.

Figure 8:
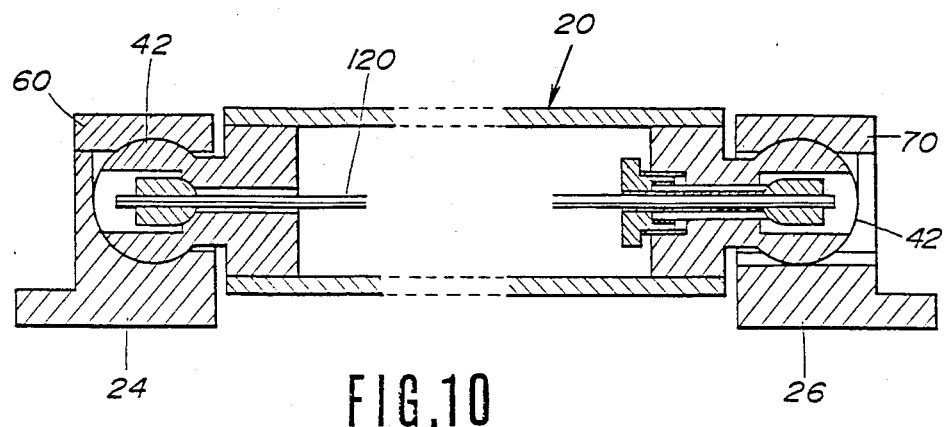
FIG. 8 is a diagram showing how the scale rod is installed in the scale channel.
Figure 10:
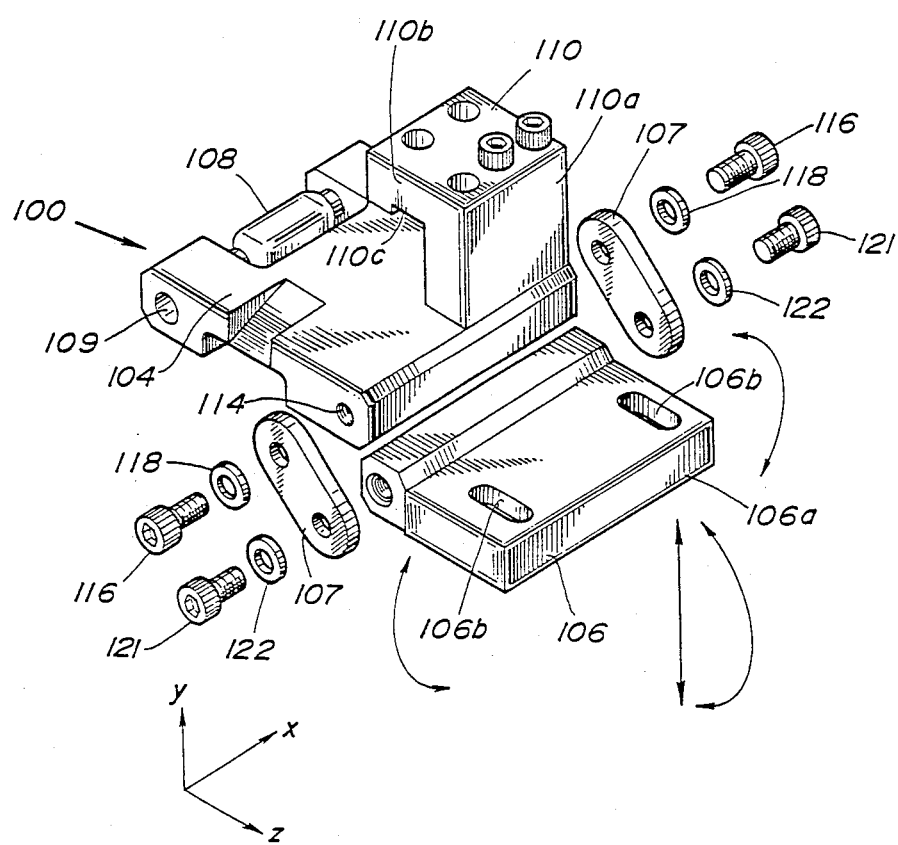
FIG. 10 is an enlarged exploded perspective view of a head assembly of the preferred embodiment of the linear scale of FIG. 1.

A positioning tool generally referred to by the reference numeral 72 is used to position the aforementioned scale channel 20 on the unit 10 as will be discussed with reference to FIG. 8. The positioning tool 72 has ball-like extensions 74 at both axial ends, which ball-like extensions have substantially the same shape as the projecting sections 40 of the scale channel 20. The positioning tool 72 is of the same length as the scale channel. The positioning tool 72 also has external contouring lands 76 serving as reference planes specifying the scale channel position relative to the neighboring surfaces of the unit.

When mounting the scale channel on the unit, the mounting blocks 24 and 26 are first positioned by means of the positioning tool 72. The mounting blocks 24 and 26 are fitted to the ball-like extensions 74 of the positioning tool and secured thereto by the cover plates 60 and 70. Then, the mounting blocks 24 and 26 are positioned by moving the contouring lands 76 into contact with the neighboring surfaces of the unit, such as machine tool, measuring device and so forth. Alternatively, the positioning tool 72 may be positioned relative to the unit by means of an electric micrometer or the like. The curved side walls 24a and 26a also should be in contact with the vertical walls of the unit. Then, bolt holes are drilled in the unit through the openings 46a in the base sections 44 and 64 of the mounting blocks 24 and 26.

Thereafter, the mounting blocks 24 and 26 are secured onto the unit 10 by means of the fastening bolts 46 through the through openings 46a. Then, the positioning tool 72 is removed from the mounting blocks 24 and 26 by releasing the cover plates 60 and 70. The scale channel 20 is then mounted on the unit by placing the ball-like ends 42 of the projecting sections 40 in the mounting blocks 24 and 26. With this arrangement, as long as the positioning tool 72 is of the same dimensions as the scale channel, it is unnecessary to reposition the scale channel 20 each time it is removed from the unit and re-applied. This makes maintenance and replacement of the scale channel easier and more convenient.

During the aforementioned positioning operation, even if the substrate surface of the unit to which the mounting blocks 24 and 26 are fixed is not parallel to the reference planes of the positioning tool, this slight angular deviation can be corrected by the ball-groove engagement between the ball-like ends 42 and the grooves 50 and 68 of the mounting blocks 24 and 26. If one of the mounting blocks 24 and 26 needs to be secured to the unit with its axis oblique to the positioning tool axis within the horizontal plane, the curved side wall 24a or 26a of the mounting block still ensures contact with the opposing vertical wall of the unit.

As will be appreciated herefrom, with the foregoing preferred construction and procedure, the scale channel of the linear scale can be conveniently mounted on and released from the corresponding section of the unit.

FIGS. 10 to 15 show the scale head assembly of the preferred embodiment of the invention. The sliding frame 104 of the head assembly 100 fits into the internal space of the scale channel. The sliding frame 104 supports on its inner end the detector head 108 and defines a through opening 109 extending across the detector head 108 parallel to the longitudinal axis of the scale channel 20. A positioning block 110 extends from the upper surface of the sliding frame. The positioning block 110 is generally L-shaped including vertical section 110a extending upwards from the upper surface of the sliding frame 104 and a horizontal section 110b extending horizontally from the top of the vertical section. The horizontal section 110b is formed with a groove 110c which is engageable with a guide extension 20a of the scale channel.

A scale rod 112 extends through the through opening 109 through the sliding frame 104 and the detector head 108.

The sliding frame 104 also has a pair of threaded openings 114 in its longitudinal faces near its outer edge. Fastening bolts 116 engage the threaded openings 114 via washers 118 to secure one end of each joint arm 107 to the longitudinal faces of the sliding frame 104. The other ends of the joint arms 107 are secured to the slider 106 by means of fastening bolts 121 and washers 122, which engage threaded openings formed near the edge of the slider closer to the outer edge of the sliding frame. The slider 106 also has a horizontally extending major section 106a in which a pair of openings 106b elongated perpendicularly to the longitudinal axis of the scale channel 20.

As shown in FIG. 11, the slider 106 has a through opening 124 extending parallel to the longitudinal axis of the scale channel. The opening 124 has a circular cross-section of larger diameter than the fastening bolts 121. A pivot rod 126 with an external diameter slightly smaller than the inner diameter of the through opening 124 is inserted through the opening. The pivot rod 126 does not fit snugly within the through opening 124 so that an annular clearance is formed therebetween. The pivot rod 126 has threaded openings 128 at both ends. The fastening bolts 121 engage the threaded openings 128 to connect the other ends of the joint arms 107 to the slider 106.

The pivoting rod 126 also has a central transverse opening 130 extending perpendicularly to its longitudinal axis. A fixing screw 132 extending through the side wall of the slider 106 into the through opening engages the transverse opening to restrict movement of the pivot rod 126 relative to the opening 124. The rounded lateral edges 106c allow the slider 106 to move relative to the pivot shaft.

With this arrangement, the slider 106 is movable relative to the stationary stand 12 of the unit. For instance, by loosening the fastening bolts 116 and 121 so as to allow the slider to move relative to the sliding frame 104, the slider 106 is free to move up and down until it lies flush with the top of the stationary stand 12 as shown in FIG. 14. In addition, fine adjustment with respect to the upper surface of the stationary stand 12 can be performed by loosening the fixing screw 132 to allow movement of the slider with respect to the pivot rod 126. This allows the slider to shift toward and away from the mounting bracket. This horizontal displacement is made possible by the elongated opening 106b in the slider, through which bolts fixing the slider to the mounting bracket extend.

Therefore, in the preferred embodiment of the invention, the head assembly can also be fitted onto the unit conveniently and without the need for spacers.

As will be appreciated herefrom, the shown embodiment fulfills all of the objects and advantages sought therefor.

Although the present invention has been disclosed in terms of the preferred embodiment of the invention, the invention should not be understood to be limited to the specific embodiment but to include all possible embodiments and modifications derived from the principle of the invention as set out in appended claims.

For examples, FIGS. 16 to 24 show modifications of the structure for mounting the scale channel to the stationary component or member of the machine tool or the like. In order to simplify the following disclosure for the modifications of the shown embodiment, the reference numerals representing components having substantially the same construction and same function in the foregoing preferred embodiment will be represented by the same reference numerals. For such components represented by the same reference numerals, detailed description thereof will be neglected for avoiding redundant recitations.

Figure 16:
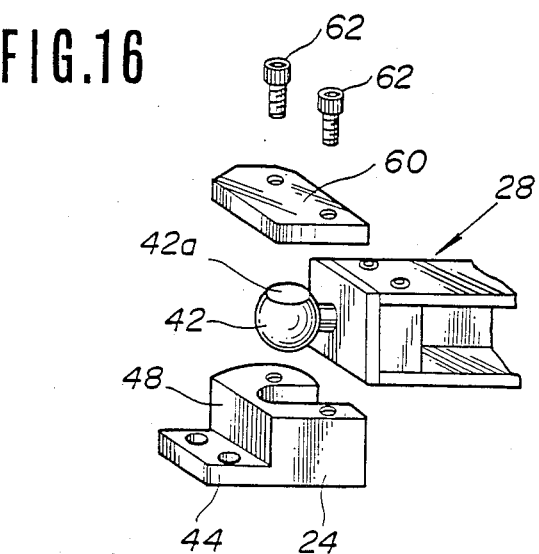
FIG. 16 is an exploded perspective view showing the first modification of the scale channel mounting structure for mounting the scale channel onto the mounting surface of the machine tool or the like by means of the mounting block.

FIG. 16 shows a first modification in which the ball-like end 42 is formed with a planer section 42a at the top thereof. The location of the planar section 42a is not limited to the top of the ball-like end 42 but can be any appropriate location. This planar section 42a mates with the corresponding plane surface of the corresponding mounting block 24 or 26 for restricting rotational movement of the ball-like end 42 with the scale channel 20 relative to the mounting block 24 or 26.

This planar section 42a serves to restrict free rotation of the ball-like end 42 with respect to the mounting block for ease of assembling the scale channel 20 to the mounting block 24 or 26 after fixing the mounting block onto the machine tool or the like.

It should be noted that further modifications for the modification of FIG. 16 can be made for providing discontinuities on the outer periphery of the ball-like member for restricting rotation of the end 42 relative to the mounting block 24 or 26. Therefore, a projection or recess can be the replacement for the planar section 42a for serving as the rotation restricting means.

Figure 17:
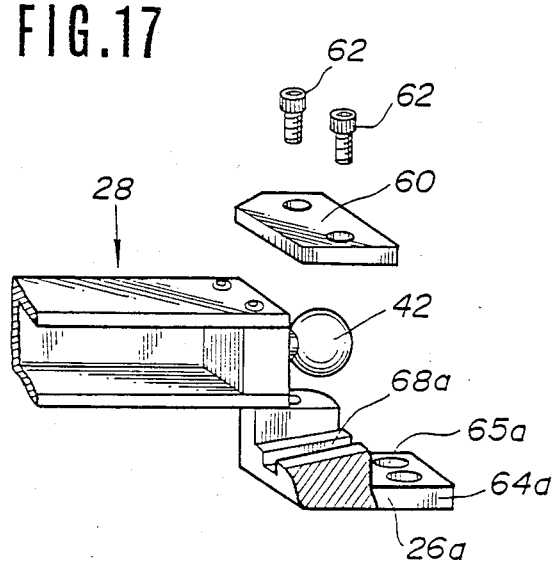
FIG. 17 is an exploded perspective view of the second modification of the scale channel mounting structure.

FIG. 17 shows a second modification in which the mounting blocks 24 and 26 are modified so as to allow adjustment for the distance of the scale channel 20 with respect to the corresponding mounting surface of the machine tool or the like. Though only the mounting block 24 is illustrated for showing the second modification, and similar modification can be applied to the other mounting block 26.

In order to allow distance adjustment for the scale channel 20, the mounting block 26a is provided with a groove 68a extending along the longitudinal axis of the scale channel 20 and inclined toward the outside. The base section 64a of the mounting block 26a is formed with a pair of elongated openings 65a having a longer axis extending along the longitudinal axis of the scale channel 20. The mounting block 26a is positioned on the mounting surface of the machine tool or the like with adjustment of the distance between the other mounting block 24. By adjusting the distance between the mounting blocks 24 and 26a, the height of the scale channel 20 relative to the mounting surface of the machine tool or the like can be adjusted. After adjustment of the distance to the other mounting block 26, the base section 64a of the mounting block 26a is fixed to the mounting surface by means of the bolts passing through the elongated opening 65a.

FIG. 18 shows the third modification, in which the cover plates 60 and 70 of the foregoing first embodiment are omitted. In this modification, fastener bolts 60a and 70a are utilized for fixing the ball-like member 42b. In order to pass the fastener bolts 60a and 70a, respective ball-like members 42b are formed with through openings 60b and 70b extending transversely relative to the longitudinal axis of the scale channel 20. The openings 60b and 70b are so located as to be placed in alignment with threaded openings 24b and 26b, to which the fastener bolts 60a and 70a are engaged. As shown in FIG. 19, a dish-shaped washer 61 is used for securing the ball-like end 42b onto the mounting block 24b by means of the fastener bolt 60a. The dish-shaped washer 61 comforms the round surface of the ball-shaped end 42b. The through openings 60b and 70b of the ball-shaped end 42b are provided with slightly greater diameters than that of the fastener bolts 60a and 70a for allowing adjustment of the scale channel position not only on the plane substantially parallel to the mounting surface of the machine tool or the like but also on the plane extending transverse to the mounting surface.

FIGS. 20 and 21 show further modification for the aforementioned third modification. In the modification of FIG. 20, the end 42c is formed into hemisphere-shaped configuration. Similarly to the foregoing third modification, through opening 60b is formed with the hemispherical end 42c for receiving the fastener bolt 60a. In the modification of FIG. 21, the end 42d is formed into an essentially cylindrical configuration with the through opening 60b. The cylindrical end 42d is formed with a planar section 43 on which the end of the through opening 60b opens. As shown in FIGS. 20 and 21, the mounting blocks 24c and 24d are formed with a groove conforming to the ends 42c and 42d.

Figure 22A:
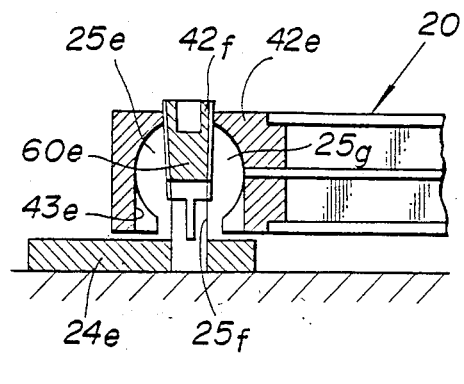
FIG. 22(A) and 22(B) are a partial section and plan view showing a fourth modification of the scale channel mounting structure.
Figure 22B:
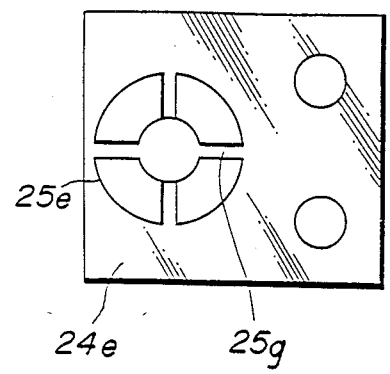

FIGS. 22(A) and 22(B) shows the fourth modification, in which the end 42e is formed as an extension of the scale channel 20 with substantially the same configuration and same size. The end 42e is formed with a downwardly opened recess 43e. The recess 43e is formed with a rounded upper end. On the other hand, the mounting block 24e comprises the lower base section 44e and a substantially ball-shaped upward extension 25e. The upward extension 25e is of the shape essentially comforming to the recess 43e. The end 42e is formed with a vertically extending through opening 42f. The upward extension 25e is formed with a threaded opening 25f having an axis located substantially in alignment with the through opening 42f. The upward extension 25e is further formed with a plurality of slits 25g radially extending from the threaded opening 25f. An essentially wedge-shaped bolt 60e engages to the threaded opening through the through opening 42f.

When the scale channel 20 is fixed to the mounting surface of the machine tool and so forth, the bolt 60e is tightened for expanding the diameter of the upward extension so that the periphery of the upward extension 25e firmly contacts with the inner periphery of the recess 43e.

Figure 23:
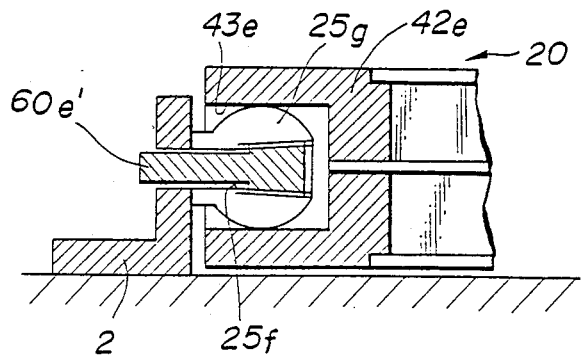
FIG. 23 is a partial section showing an alternative of the fourth modification of FIG. 22.

Although the foregoing fourth embodiment employs the end 42e having a recess 43e extending substantially transverse to the longitudinal axis of the scale channel 20, the recess 43e can be formed to extend sunstantially along the longitudinal axis of the scale channel 20, as shown in FIG. 23. The ball-shaped extension 25e with the threaded opening 25f and the radially extending slits 25g is correspondingly extended substantially along the longitudinal axis of the scale channel 20.

In this case, the fastening bolt 60e' has a wedge-shaped configuration increasing the diameter thereof toward the mounting block 24e. For fixing the ball-shaped extension 25e by expanding its diameter, the bolt 60e' is rotated in a loosening direction.

Figure 24:
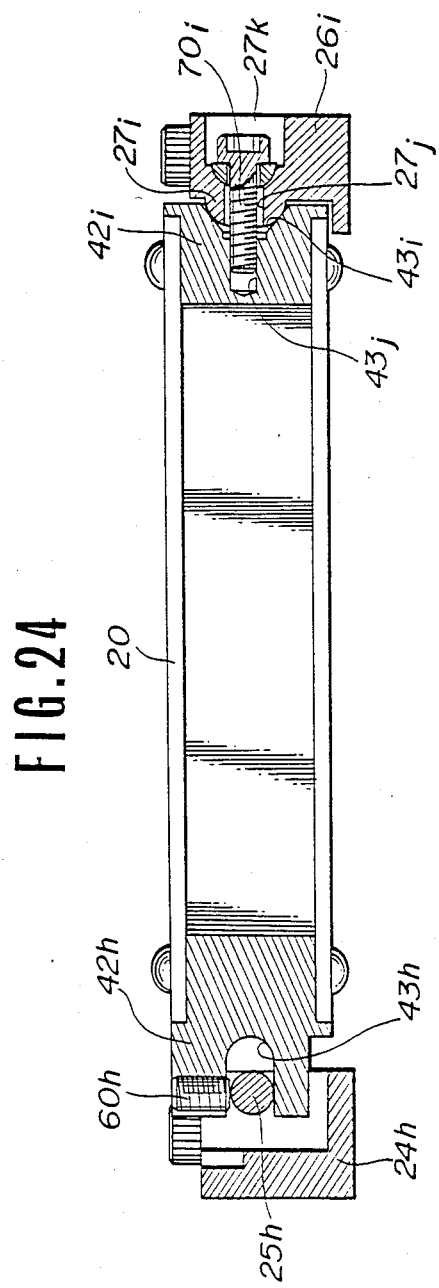
FIG. 24 is a longitudinal section of the fifth modification of the scale channel mounting structure.

FIG. 24 shows the fifth modification of the preferred embodiment of the linear scale according to the invention. In this modification, an end 42h is formed with a substantially U-shaped recess 43h having the opening end directed toward a mounting block 24h. The mounting block 24h has a cylindrical bar 25h extending transversely to the longitudinal axis of the scale channel 20. The cylindrical bar 25h is engageable to the U-shaped recess 43h.

The other end 42i is formed with a substantially conical or hemispherically-shaped recess 43i. A mounting block 26i corresponding to the end 42i has conical or semispherical projection 27i conforming to the recess 43i. The end 42i is formed with a through opening 27j extending substantially along the longitudinal axis of the scale channel and having the outer end opening to a recess 27k formed in the mounting block 26i. The end 42i is also formed with a threaded opening 43j having the axis extending substantially in alignment with the axis of the through opening 27j of the mounting block 26i. Through the through opening 27j, a fastening bolt 70i engages with the threaded opening 43j of the end 42i.

When the scale channel 20 is secured onto the mounting surface of the machine tool or the like, at first, the end 42h engages the mounting block 24h with engagement of the U-shaped recess 43h and the cylindrical bar 25h. Thereafter, the other end 42i engages to the mounting block 26i with engagement of the recess 43i with the projection 27i. Then, the fastening bolt 70i is tightened up to firmly fix the end 42i to the mounting block 26i. At this time, the engagement between the U-shaped recess 43h and the cylindrical bar 25h is loose for allowing axial movement of the scale channel 20. After firmly fixing the end 42i to the mounting block 26i, a fastening bolt 60h extending through a threaded opening formed through the end 42i is tighened so that the head of the bolt 60h firmly contacts with the periphery of the cylindrical bar 25h for fixing the end 42h onto the mounting block 24h.

Figure 25:
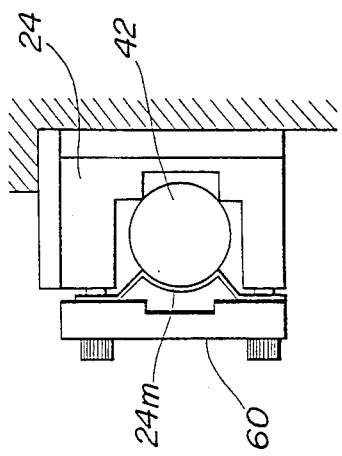
FIG. 25 is a cross-section showing the sixth modification of the scale channel mounting structure.

FIG. 25 shows the sixth modification. In this modification, a resilient member 24m is inserted within the mounting block 24 which is essentially the same as that of the foregoing preferred embodiment. Preferably, the resilient member 24m comprises a metal leaf spring which becomes rigid after fixing the end 42 to the mounting block 24. The resilient member is advantageously provided for temporarily fixing the end 42 onto the mounting block 24 during mounting the scale channel 20 onto the mounting surface of the machine tool or the like.

In the alternative, the resilient member 24m can serve as means for fixing the end 42 onto the mounting block 24. In this case, the resilient member may be provided with a sufficient resilient force, sufficient for firmly holding the end 42 within the mounting block.

Figure 26:
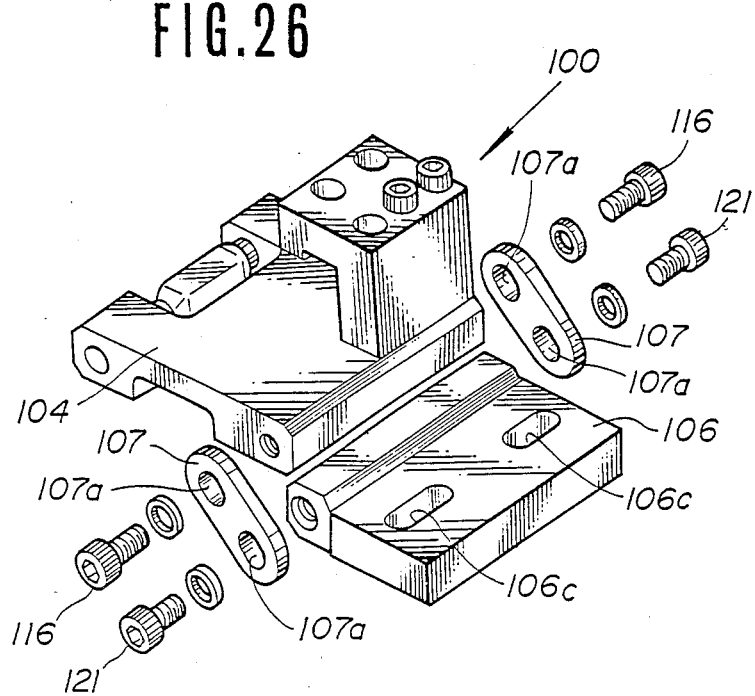
FIG. 26 is an exploded perspective view of a first modification of the head assembly in the preferred embodiment of the invention.

FIG. 26 shows a first modification for the scale head assembly of the foregoing preferred embodiment of the invention. In this embodiment, the joint arms 107 for connecting the sliding frame 104 and the slider 106 is formed with elongated openings 107a to pass the fastening bolts 116 and 121. The slider 106 is formed with elongated holes 106c having longer axes extending substantially parallel to the longitudinal axis of the scale channel 20, which direction of the longer axes of the holes is transverse to that of the holes 106b of the foregoing preferred embodiment.

In this modification, adjustment of the distance between the sliding frame 104 and the slider 106 can be performed by means of the elongated openings 107a of the joint arms 107. The elongated holes 106c of the slider 106 extending parallel to the longitudinal axis of the scale channel 20 facilitate easier longitudinal position adjustment of the head assembly 100 relative to the moving object, to which the slider 106 is fitted. For instance, in order to fix the slider to the moving object, threaded holes may be formed in the moving object. When the slider 106 with the sliding frame 104 as connected by means of the joint arms 107 is placed approximately in a corresponding position to the moving object, to which the slider is fitted, the axes of the threaded holes of the moving object and the holes of the slider 106 tend to slightly offset. Therefore, alignment of the threaded holes in the moving object and the holes of the slider 106 would be difficult unless the elongated hole 106 is provided.

Figure 27:
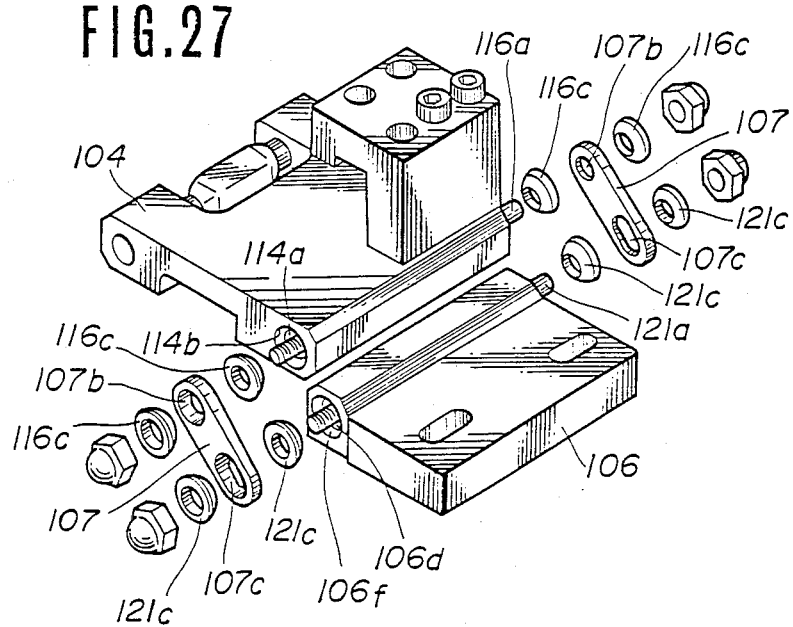
FIG. 27 is an exploded perspective view of an alternative embodiment of the first modification of the head assembly.

In the alternative, the elongated openings 107a of the foregoing first modification of the head assembly can be replaced with through openings 114a and 106d respectively formed through the sliding frame 104 and the slider 106, and opening into substantially hemispherical recess 114b and 106f as shown in FIG. 27. Pivotal shafts 116a and 121a with threaded ends 116b and 121b extend through the openings 114a and 106d. The diameter of the pivotal shafts 116a and 121a are slightly smaller than that of the holes 114a and 106d to be loosely received through the openings. The joint arms 107 are also formed with larger diameter holes 107b and 107c having greater diameters than that of the shafts 116a and 121a. Substantially hemispherical washers 116c and 121c having surfaces respectively conforming the openings 107b, 107c and the hemispherical recesses 114b and 106f, are provided. The hemispherical washers 116c and 121c serve for rigidly fixing the joint arms 107 to the sliding frame 104 and the slider 106, when fastening nuts 116d and 121d are engaged and tightened to the threaded ends 116b and 121b of the pivotal shafts 116a and 121a.

The hemispherical washers 116c and 121c and the pivotal shafts 116a and 121a having a slightly smaller diameter than that of the through openings 104a and 106d allow slight offset of the axes of the pivotal shafts oblique to the axes of the through openings so that the slider 106 may fit the moving object.

Figure 28:
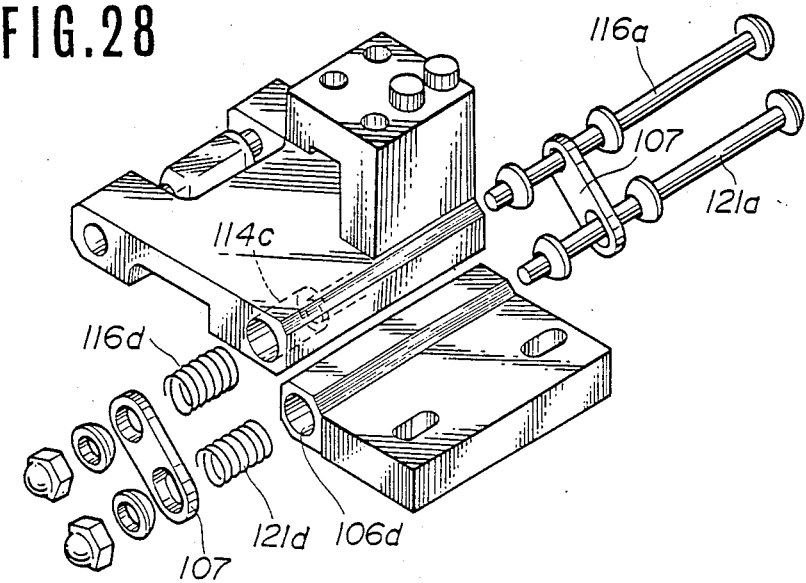
FIG. 28 is an exploded perspective view of the a further alternative embodiment of the first modification of the head assembly.

In the further alternative, resilient springs 116d and 121d are inserted within a larger diameter section 114c and 116g formed at the ends of the through openings 114a and 106d, as shown in FIG. 28. The resilient springs 116d and 121d absorb stress applied and vibration to the pivotal shafts 116a and 121a.

Figure 29:
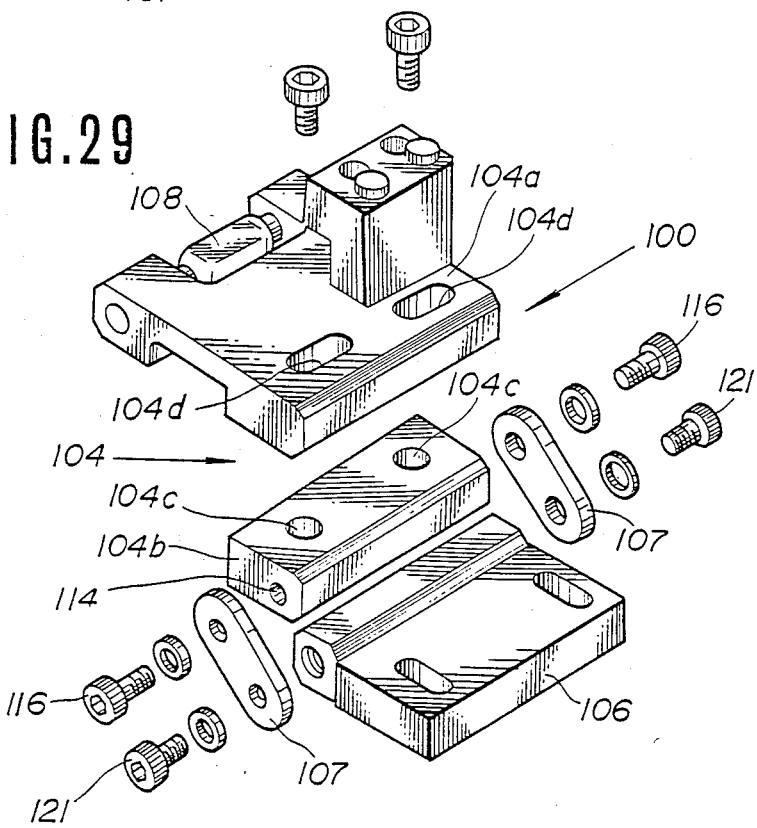
FIG. 29 is an exploded perspective view of the second modification of the head assembly.

FIG. 29 shows the second modification of the head assembly 100. In this modification, the sliding frame 104 is separated into two pieces constituting of a first major section 104a carrying the head 108 and a second auxiliary section 104b. The auxiliary section 104b has an upper surface mating the lower surface of the major section 104a. On the upper surface, the auxiliary section 104b is formed with a pair of threaded openings 104c. At the locations corresponding to the threaded openings 104c of the auxiliary section 104b, the major section 104a is formed with a pair of elongated holes 104d. The elongated holes 104d have longer axis directed substantially along the longitudinal axis of the scale channel 20. With the elongated holes, the major section 104a and the auxiliary section 104b can shift in a longitudinal direction within a region defined by the longitudinal dimension of the elongated holes.

The auxiliary section 104b is also formed with the threaded openings 114 to which the fastener bolts 116 for fixing the joint arms 107 engage. Therefore, the auxiliary section 104b is connected to the slider 106 by means of the joint arms 107.

With this arrangement, when maintenance for the head 108 become necessary, the slider 106 can be retained on the moving object, since the position adjustment between the major section 104a and the slider 106 can be performed by adjusting the position of the major section relative to the auxiliary section 104b. During adjustment of the position of the major section 104a relative to the auxiliary section 140b, the elongated holes 104d allow a slight offset between the major section and the auxiliary section.

Figure 30:
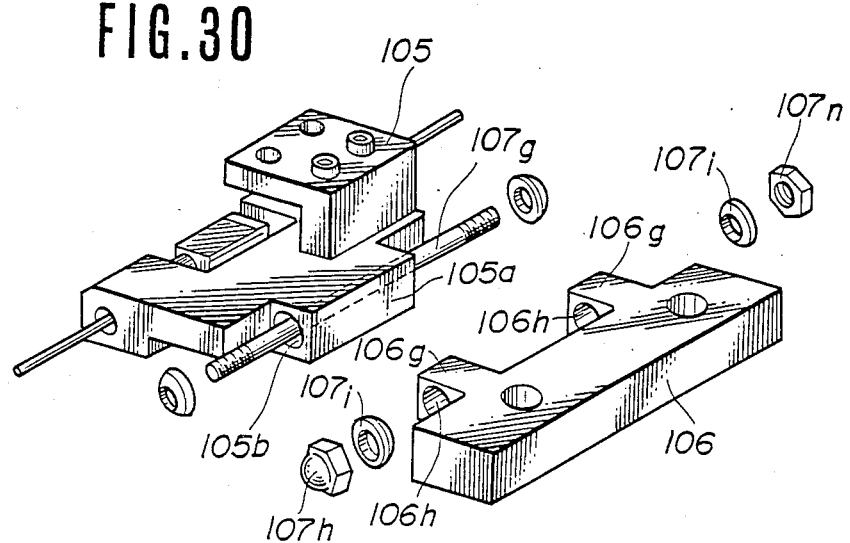
FIG. 30 is an exploded perspective view of the third embodiment of the head assembly.

FIG. 30 shows the third modification of the head assembly. In this modification, the sliding frame 105 carrying the head 108 is provided with an extension 105a. The extension 105a is engageable with extensions 106g of the slider 106. The extension 105a is formed with an opening 105b which has an axis aligned with axes 106h of the extensions 106g. A hinge shaft 107g passes through the openings 105b and 106h in order to form a hinge. With this hinge, the sliding frames 105 and 106 are pivotally displaceable to each other.

The shaft 107g has a smaller diameter than the internal diameter of the openings 105b and 106h so that the axis of the hinge shaft 107g can be oblique to one axis of the openings 105b and 106h. This allows the slider 106 to be fitted onto the plane slightly oblique to the mounting surface of the machine tool or the like, to which the scale channel 20 is mounted. Fastening nuts 107h with hemispherical washers 107i engage both ends of the hinge shaft 107g so as to fix the relative position of the sliding frame 105 and the slider 106 after fitting the slider 106 onto the mating surface of the moving object.

Figure 31:
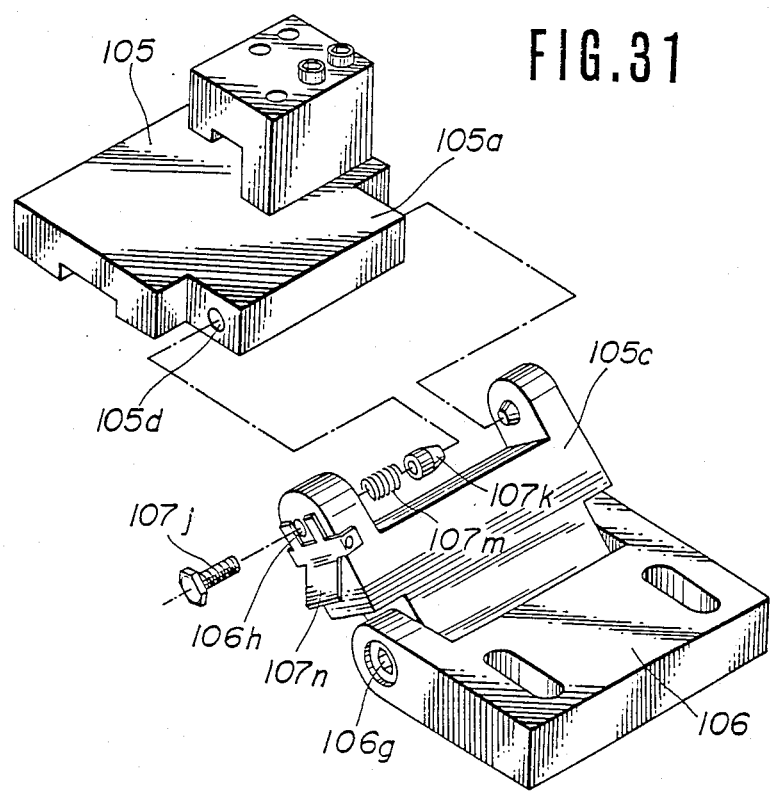
FIG. 31 is a view showing the fourth modification of the head assembly.

FIG. 31 is the fourth modification of the head assembly in the preferred embodiment of the linear scale. In this embodiment, the sliding frame 105 is formed with the extension 105a engageable to an auxiliary section 105c which is, in turn, connected to the slider 106 by means of fastener bolts 106g, similarly to the foregoing second embodiment. The extension 105a is formed with recesses 105d. Opposing the recesses 105d, a fastener pin 107j with a conical head 107k passes the opening 106h of the slider 106. The fastener pin 107j is normally biased by a spring 107m toward the recess 105c for establishing a hinge connection between the sliding frame 105 and the slider 106. A manually operable release lever 107n is associated with the fastener pin 107j for releasing engagement between the conical head 107k from the recess.

As will be appreaciated herefrom, the modifications of the preferred embodiment accomplish a same or comparable effect as that accomplished by the preferred embodiment.

What is claimed is:
1. A linear scale comprising:
a scale;

a head assembly associated with said scale and movable therealong for measuring displacement of a moving object relative to a stationary member;
a scale channel supporting said scale;
means for positioning said head assembly and said scale channel relative to said moving object and said stationary member, said positioning means being independent of said scale channel, said positioning means allowing displacement of at least one of said head assembly and said scale channel for fine position adjustment relative to said object and/or said stationary member, and said positioning means incorporating a fastening means restricting movement of said at least one of said head assembly and said scale channel relative to said positioning means in order to hold said at least one of said head assembly and said scale channel in place relative to said object and/or stationary member.

2. A linear scale comprising
a scale;
a head assembly associated with said scale and movable therealong for measuring displacement of a moving object relative to a stationary member;
a scale channel supporting said scale;
means for positioning said head assembly and said scale channel relative to said moving object and said stationary member, said positioning means being independent of at least one of said head assembly and said scale channel to allow displacement of said one of said head assembly and said scale channel for fine position adjustment relative to said object and/or said stationary member, and including a pair of mounting blocks fixed to one of said stationary member and said moving object and releasably supporting said scale channel, said mounting blocks allowing gimbal displacement of said scale channel relative thereto for positioning adjustment of said scale channel relative to said moving object, and said positioning means incorporating fastening means restricting movement of said one of said head assembly and said scale channel relative to said positioning means in order to hold said one of said head assembly and said scale channel in place relative to said object and/or said stationary member.

3. The linear scale set forth in claim 2, wherein said scale channel has rounded extensions at both of its longitudinal ends, said rounded extensions releasably engaging a corresponding one of said mounting blocks pivotally to allow displacement of said scale channel relative to said mounting blocks.

4. The linear scale set forth in claim 3, wherein said mounting block has a groove receiving said rounded extension pivotably, said groove being open at one end to allow removal of said extension therefrom, and a cover member is provided for closing said open end and so retain said extension within said groove.

5. The linear scale set forth in claim 2, wherein said mounting block has a convex vertical wall in tangential contact with a vertical section of said movable object.

6. The linear scale as set forth in claim 3, wherein said rounded extensions are formed with at least one flat section for restricting rotational movement of said extension relative to said mounting block by mating said flat section to the flat surface of said mounting block.

7. The linear scale as set forth in claim 2, wherein said mounting block incorporating means for allowing height adjustment for said scale channel relative to the mounting surface of said one of stationary member and said moving object, to which said mounting block is fixed.

8. The linear scale as set forth in claim 7, wherein said mounting block has a groove receiving a rounded extension axially extending from a longitudinal end of said scale channel in pivotal fashion, said groove being inclined relative to aid mounting plane for adjusting the height of said scale channel relative to aid mounting surface.

9. The linear scale as set forth in claim 3, wherein said fastening means comprises a fastener bolt extending through said rounded extension and engaging a threaded opening formed in said mounting block.

10. The linear scale as set forth in claim 1, wherein said positioning means comprises a mounting block having a round-headed extension and an axial extension axially extending from the longitudinal end of said scale channel, said axial extension having a recess engageable to said round-headed extension of said mounting block.

11. The linear scale as set forth in claim 10, wherein said round-headed extension is variable in its diameter between a first smaller diameter and a second larger diameter, said round-headed extension allowing free pivotal movement of said scale channel thereabout as loosely engaged to said recess, and restricting pivotal movement of said scale channel by firmly engaging with said recess while its diameter is said second larger diameter.

12. The linear scale as set forth in claim 11, wherein said round-headed extension is associated with a wedge-shape member movable between first and second positions relative thereto, and said wedge-shape member, in its first position, maintains the diameter of said round-headed extension at said first smaller diameter, and expands the diameter of said round-headed extension into said second larger diameter as it is moved into said second position.

13. The linear scale as set forth in claim 12, wherein said wedge-shape member is a wedge-form screw engaging a threaded hole formed in said round-headed extension.

14. The linear scale as set forth in claim 1, wherein said positioning means comprises a first mounting block having a connector pin engageable to a recess formed in an first extension axially extending from a first longitudinal end of said scale channel, and a second mounting block having a projection engageable with a recess formed in a second extension axially extending from a second longitudinal end of said scale channel, engageable between said pin of said first mounting block and said recess of said first extension allowing axial displacement along the longitudinal axis and pivotal movement thereabout.

15. The linear scale as set forth in claim 3, which further comprises a resilient member disposed within said mounting block for restricting movement of the rounded extension relative to said mounting block.

16. A linear scale comprising:
a scale;
a head assembly associated with said scale and movable therealong for measuring displacement of a moving object relative to a stationary member;
a scale channel supporting said scale;
means for positioning said head assembly and said scale channel relative to said moving object and said stationary member, said positioning means being independent of at least one of said head assembly and said scale channel to allow displacement of said one of said head assembly and said scale channel for fine position adjustment relative to said object and/or said stationary member, and including a slider separate from said head assembly and a pivotal joint being pivotal about said head assembly and said slider, said slider being secured to one of said stationary member and said moving object, and said positioning means incorporating fastening means restricting movement of said one of said head assembly and said channel relative to said positioning means in order to hold said one of said head assembly and said scale channel in place relative to said object and/or said stationary member.

17. The linear scale set forth in claim 16, wherein said joint includes hinge means allowing pivotal displacement of said slider about a pivot axis between said joint and said slider.

18. The linear scale as set orth in claim 17, wherein said slider is formed with an elongated hole having a longer axis essentially parallel to the longitudinal axis of said scale channel, and said elongated hole is positioned corresponding to a threaded opening formed in said one of stationary member and said moving object, to which threaded opening a fastening bolt engages for fixing said slider onto said one of stationary member and said moving object, said elongated hole allowing offset of said slider relative to said threaded opening.

19. The linear scale as set forth in claim 17, where said joint has elongated holes through which a fastener for connecting said joint to said head assembly and said slider passes, said elongated hole of said joint being so arranged as to allow relative displacement generally in a direction transverse to the longitudinal axis of said scale channel.

20. The linear scale as set forth in claim 19, wherein said fastener comprises bolts engageable to threaded openings formed in said head assembly and said slider.

21. The linear scale as set forth in claim 17, wherein each of said joints is formed with through openings having a larger diameter than the shaft portion of a fastener provided for connecting the joint to said head assembly and said slider, and said fastener comprises fastener bolts engageable to threaded openings formed in said head assembly and said slider and a hemispherical washer engageable to said through openings formed in said joint.

22. The linear scale as set forth in claim 17, wherein said joint is formed with through openings having a larger diameter than threaded shafts extending from said head assembly and said slider, to which threaded shafts fastening nuts are engageable with engagement of hemispherical washers to said through openings of said joint.

23. The linear scale as set forth in claim 17, wherein said positioning means further comprises a resilient member for resiliently restricting relative displacement of said head assembly and said slider.

24. The linear scale as set forth in claim 17, wherein said joint comprises a linking arm and an intermediate piece, said intermediate piece being adapted to be fixed to said head assembly and incorporating means allowing relative offset of said head assembly and said intermediate piece generally in a direction parallel to the longitudinal axis of said scale channel, and said intermediate piece being pivotally connected to said slider by means of said linking arm.

25. The linear scale as set forth in claim 17, wherein said joint comprises a hinge mechanism formed between said head assembly and said slider.

26. The linear scale as set forth in claim 25, wherein said hinge mechanism comprises a hinge shaft and a recess receiving one end of said hinge shaft.

27. The linear scale as set forth in claim 25, wherein said hinge shaft is resiliently biased toward said recess for engagement with the latter and releasable from said recess by applying manual force in a direction against said resilient force.

28. A method for mounting a linear scale comprising the steps of:
   providing a linear scale including a head assembly and scale channel which is in a predetermined length and a predetermined shape;
   providing a pair of mounting brackets engageable to both longitudinal ends of said scale channel;
   providing a positioning tool of substantially the same length to said scale channel and having a positioning plane adapted to mate with a corresponding plane of a stationary member to which the linear scale is positioned and secured;
   engaging said mounting brackets onto both longitudinal ends of said positioning tool and positioning said mounting bracket relative to said stationary member by means of said positioning tool;
   fixing said mounting blocks onto said stationary member at the positions determined by the preceding step; and
   releasing said positioning tool from said mounting blocks as fixed to said stationary member and mounting said scale channel with engagement of its longitudinal ends to said mounting blocks.

29. The method set forth in claim 28, in which said positioning of said mounting block relative to said first object by means of said positioning tool is performed by allowing pivotal displacement of said mounting block about the ends of said positioning tool.

30. The method set forth in claim 28, further comprising the following steps executed after the steps of claim 28:
   securely mounting on the second of said objects the base of a scale slider having a head displaceable relative to said base and fixable at any point in a positional range relative to said base; and
   displacing said head in a direction or directions perpendicular to the axis of linear movement monitored by the linear scale until said head slidably engages a support member of said scale channel and fixing said head in that position.

31. A method for mounting a linear scale used to measure the relative displacement of two objects, comprising the steps of:
   mounting one of a pair of mounting brackets on a first one of said objects;
   coupling opposite ends of a positioning tool, identical in size and shape to a scale channel forming part of the finished linear scale, to each of said mounting brackets so as to hold the mounting brackets at a fixed linear separation;
   positioning the remaining mounting bracket on said first object at said fixed linear separation and fixing said remaining mounting bracket to said first object;
   removing said positioning tool from said mounting brackets;

coupling opposite ends of said scale channel to said mounting brackets;

engaging said mounting brackets onto both longitudinal ends of said positioning tool and positioning said mounting bracket relative to said stationary member by means of said positioning tool;

fixing said mounting blocks onto said stationary member at the positions determined by the preceding step; and releasing said positioning tool from said mounting blocks as fixed to said stationary member and mounting said scale channel with engagement of its longitudinal ends to said mounting blocks.

32. A linear scale comprising a scale;

a head assembly associated with said scale and movable therealong for measuring displacement of a moving object relative to a stationary member;

a scale channel supporting said scale;

means for positioning said head assembly relative to one of said moving object and said stationary member, with which said head assembly causes relative movement with respect to said scale, said position means being interpositioned between said scale channel and said head assembly for allowing said head assembly to be displaced independent of said scale channel, and said positioning means incorporating a fastening means restricting movement of said head assembly relative to said positioning means in order to hold said head assembly and said scale channel in place relative to said object and/or said stationary member.

* * * * *